United States Patent

Koblitz et al.

[11] Patent Number: 5,274,451
[45] Date of Patent: Dec. 28, 1993

[54] SYNC SEPARATOR

[75] Inventors: Karl R. Koblitz, Meylan, France; Enrique Rodriguez-Cavazos, Indianapolis, Ind.

[73] Assignee: Thomson Consumer Electronics, Inc., Indianapolis, Ind.

[21] Appl. No.: 843,064

[22] Filed: Mar. 2, 1992

[51] Int. Cl.⁵ .............................................. H04N 5/08
[52] U.S. Cl. .................................... 358/153; 358/155
[58] Field of Search ............... 358/153, 154, 155, 156, 358/157, 158, 159, 148, 149, 150

[56] References Cited

U.S. PATENT DOCUMENTS

| | | | |
|---|---|---|---|
| 3,639,780 | 2/1972 | Lovelace | 358/153 |
| 3,699,256 | 10/1972 | Roth | 358/153 |
| 3,869,568 | 3/1975 | Ueda et al. | 358/153 |
| 4,185,299 | 1/1980 | Harford | 358/153 |
| 4,313,137 | 1/1982 | Weissmueller | 358/153 |
| 4,821,098 | 4/1989 | Smeulers | 358/153 |

OTHER PUBLICATIONS

A Technical Note & Appl., entitled TEA 2026 TV Scanning Monitor and Power Supply, in the name of Driessche, dated 1983, pp. 9–12.
A Technical Note entitled Sync Processor TDA 2595, dated prior to Nov. 1989, pp. 20–28.

Primary Examiner—James J. Groody
Assistant Examiner—Michael H. Lee
Attorney, Agent, or Firm—Joseph S. Tripoli; Joseph J. Laks; Sammy S. Henig

[57] ABSTRACT

A signal slicer of a sync separator includes a comparator for generating an output signal in accordance with a difference between a black level restored video signal and a slice level. The slice level is established dynamically, in accordance with the peak level of the sync pulse between the peak of the sync pulse and the black level. When the sync pulse occurs in the video signal, the output signal of the signal slicer assumes an active, first logical state; conversely, between consecutively occurring sync pulses, the output signal assumes an inactive, second logical state. The slice level is clamped to a predetermined level to prevent the occurrence of the first logical state when no video signal is received.

5 Claims, 1 Drawing Sheet

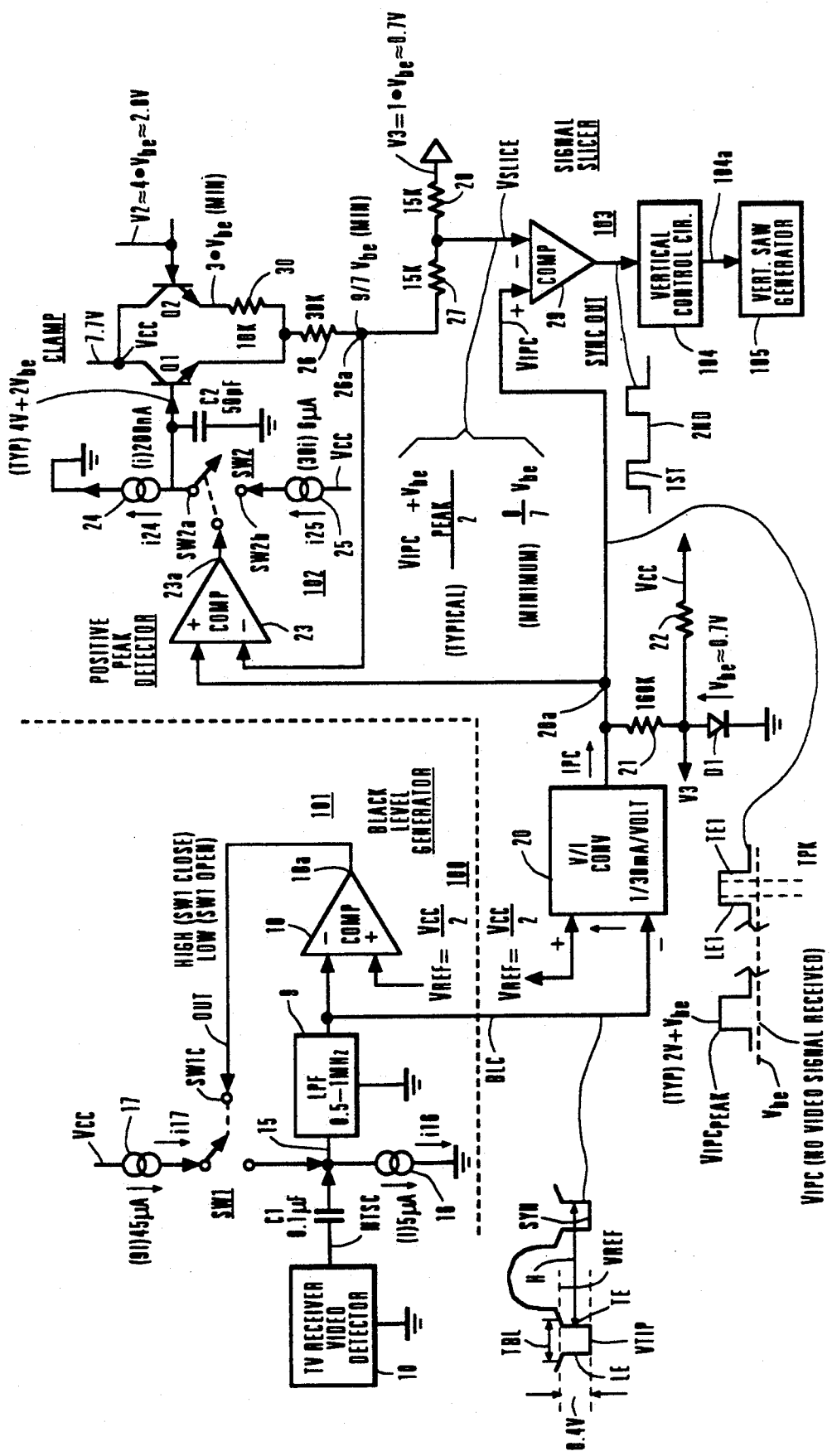

SYNC SEPARATOR

BACKGROUND OF THE INVENTION

1. Field of the Invention

The invention relates to a sync separator of a video apparatus.

2. Description of the Background

In one prior art sync separator of a television receiver, a black level generator generates from a baseband video signal, a black level restored baseband video signal. In the black level restored video signal, a level that corresponds to a black level is established at a predetermined D.C. level.

The black level restored video signal is coupled to a peak detector that includes a capacitor. In the peak detector, the capacitor is, for example, charged from a switchable source of a first current, during a portion of each horizontal line period, when a difference between a voltage in the capacitor and a voltage representative of the black level restored video signal is at a predetermined polarity. Such difference occurs during a portion of the video line when a sync pulse occurs. The capacitor is discharged by a source of a second current that is smaller than the first current, during the rest of each period. The ratio between the currents is selected such that, in close loop operation, the aforementioned difference occurs when the sync pulse occurs but not outside the occurrence of the sync pulse. The close loop operation maintains the capacitor voltage at a level that is representative of a peak level of the sync pulse.

A signal slicer of the sync separator includes a comparator for generating an output signal in accordance with a difference between the black level restored video signal and a slice level. The slice level is established, in accordance with the peak level of the sync pulse, for example, midway between the peak of the sync pulse and the black level. When the sync pulse occurs in the video signal, the output signal of the signal slicer assumes an active, first logical state; conversely, between consecutively occurring sync pulses, the output signal assumes an inactive, second logical state. It may be desirable to prevent the output signal from assuming the active, first state when, for example, no video signal is present. Video signal may not be present when, for example, a user tunes the receiver to an unused channel.

SUMMARY OF THE INVENTION

A sync separator of a video display apparatus, embodying an aspect of the invention, includes a source of an input video signal containing sync and picture information. A black level generator is responsive to the video signal for generating a first signal with a predetermined black level containing sync pulses that correspond to the sync information of the input video signal. A peak detector is responsive to the first signal for generating a peak level indicative signal that is indicative of a peak level of the pulses of the first signal. A slice level indicative signal is generated at a level that is indicative of a level intermediate the black level and the peak level. An output signal is generated at an active state, when a given pulse of the first signal occurs, and at an inactive state, when the pulses of the first signal do not occur. A switching arrangement establishes the output signal at the inactive state when the peak level is smaller than a predetermined value, such that when the peak level is at a normal operation level the operation of the switching arrangement is disabled.

BRIEF DESCRIPTION OF THE DRAWING

The sole FIGURE illustrates a sync separator, embodying an aspect of the invention.

DETAILED DESCRIPTION OF THE PREFERRED EMBODIMENTS

The sole FIGURE illustrates a sync separator 100, embodying an aspect of the invention. A baseband video signal NTSC obtained from a video detector 10, of a television receiver is A.C.-coupled via a capacitor C1 to a junction terminal 15 of a black level generator 101. Signal NTSC is provided in accordance with the NTSC standard and contains horizontal sync pulses. A D.C. current source 16 generates a D.C. current i16 that is continuously coupled to terminal 15. A D.C. current source 17 is coupled via a switch SW1 to terminal 15 to generate pulses of a D.C. current i17 that occur when the horizontal sync pulses occur and that flow in the opposite direction in capacitor C1 with respect to current i16.

Signal NTSC is D.C.-level shifted in accordance with a D.C. voltage that is developed across capacitor C1 by currents i16 and i17. Level shifted signal NTSC is coupled via a low-pass-filter 19 to an inverting input terminal of an amplifier 18 to form a signal BLC. Filter 19 removes signal components from the signal at terminal 15 at frequencies above, for example, 0.5 MHz. With the exceptions of being D.C. level shifted and being low-pass-filtered, signal BLC has a similar waveform as signal NTSC and contains sync pulses SYN when the horizontal sync pulses occur.

When signal BLC is less positive than a positive reference voltage VREF, applied to a non-inverting input terminal of amplifier 18, an output signal developed at an output terminal 18a of amplifier 18 causes switch SW1 to be engaged. When switch SW1 is engaged, a pulse of current i17 flows in capacitor C1 and charges capacitor C1 via terminal 15. At all other times, D.C. current i16 flows in capacitor C1 and discharges capacitor C1, switch SW1 is disengaged and the generation of the pulse of current i17 is prevented.

A ratio between a peak value of current i17 and current i16 is selected, in accordance with a ratio between a length of a horizontal period H and a pulse width of sync pulse SYN of signal BCL. The selected current ratio is such that, in close-loop steady state operation, signal BCL is less positive than voltage VREF only during a portion TBL of a given horizontal video line. Portion TBL begins before the occurrence of a leading edge LE and ends after the occurrence of a trailing edge TE of sync pulse SYN. Each of the beginning and end times of portion TBL occurs when signal BLC is at the black level. Because at the beginning and end times of portion TBL of signal BLC is equal to D.C. voltage VREF, the black level of signal BLC is also equal to voltage VREF.

Black level clamped signal BLC is coupled to an inverting input terminal of a voltage-to-current converter 20. A non-inverting input terminal of converter 20 is coupled to voltage VREF. Converter 20 generates a pulse of a current IPC at a magnitude that is proportional to a difference between signal BLC and voltage VREF. When signal BLC is at the black level and equal to voltage VREF, current IPC is nominally zero.

A D.C. biasing current in a resistor 22 that is coupled to a diode D1 produces a forward voltage at a value referred to herein as VBE that is approximately 0.7 volts. Current IPC is coupled via a load resistor 21 to diode D1. A voltage pulse of a signal VIPC, developed at a terminal 20a of resistor 21, is equal to a sum of the forward voltage of diode D1, VBE, and a voltage drop across resistor 21 that is proportional to current IPC.

Signal VIPC is coupled to a noninverting input terminal of an amplifier or a comparator 23 of a positive peak detector 102. An output terminal 23a of comparator 23 is coupled to a control terminal of a switch SW2. A main current conducting terminal SW2a of switch SW1 and a D.C. source 24 of a D.C. current i24 are coupled to a base of an emitter follower transistor Q1. A capacitor C2, in which a voltage representative of a peak voltage of a sync pulse of signal VIPC is developed, is also coupled to the base of transistor Q1. A D.C. current source 25 generates a pulse of a current i25 is coupled to capacitor C2 via switch SW2 when switch SW2 is engaged. A D.C. voltage developed in capacitor C2 is coupled in a feedback manner via emitter follower transistor Q1 to an inverting input terminal of amplifier 23. The emitter of transistor Q1 is coupled via a junction terminal 26a, between a resistor 26 and a resistor 27. Resistor 26 is coupled to the emitter of transistor Q1 and resistor 27 is coupled between resistor 26 and a resistor 28. Resistor 28 is coupled between resistor 27 and a reference voltage that is equal to VBE. Thus, resistors 26, 27 and 28 form a voltage divider with respect to the voltage in capacitor C2.

A ratio between a peak value of current i25 and current i24 is selected, in accordance with a ratio between a length of horizontal period H and the pulse width of sync pulse SYN. The selected current ratio is such that, in close loop steady state operation, signal VIPC is more positive than the voltage that is developed at terminal 26a between resistors 26 and 27 only during a peak portion TPK of the sync pulse of signal VIPC. Portion TPK begins after the occurrence of a leading edge LE1 and ends prior to the occurrence of a trailing edge TE1 of the sync pulse of signal VIPC. Because each of the beginning and end times of portion TPK of signal VIPC occurs during the peak of the pulse of signal VIPC, the D.C. voltage developed at the inverting input terminal of amplifier 23 from the voltage across capacitor C2 is equal to the peak level of the pulse of signal VIPC.

In steady state close loop operation of peak detector 102, a slice level signal VSLICE developed at a junction terminal between resistors 27 and 28 is equal to a sum of one-half of the peak level of signal VIPC and one-half VBE. Signals VSLICE and VIPC are coupled to corresponding inputs of a differential amplifier or comparator 29 to form a signal slicer 103. During a portion of the sync pulse of signal VIPC, when signal VIPC is more positive than signal VSLICE, an output signal SYNCOUT of amplifier 29 is generated at an active, first logical state. On the other hand, outside the occurrence of the sync pulse of signal VIPC, signal SYNCOUT is at an inactive, second logical state. In this way, separated sync pulses are produced in signal SYNCOUT. Advantageously, slice level signal VSLICE is adaptive and dynamically changes in accordance with the peak level of signal VIPC.

For reasons that are explained later on, it may be desirable to prevent the occurrence of the active first logical state in signal SYNCOUT and to maintain signal SYNCOUT continuously at the inactive second logical state, when signal NTSC is not provided and also when the peak-to-peak amplitude of the sync pulses of each of signal NTSC, BLC, or VIPC is smaller than a corresponding predetermined magnitude. Signal NTSC is not provided when, for example, a user tunes the television receiver to an unused television channel.

In accordance with an aspect of the invention, a clamp transistor Q2 operating as a switch has an emitter that is coupled via a resistor 30 to a junction terminal between resistor 26 and the emitter of transistor Q1. A reference voltage V2 that is equal to approximately 4 VBE or 2.8 volts is developed at the base of transistor Q2. When the peak magnitude of signal VIPC is sufficiently large, transistor Q2 is nonconductive and has no effect. Clamp transistor Q2 prevents the voltage of signal VSLICE from becoming smaller than 8/7 VBE irrespective of the peak magnitude of signal VIPC. Consequently, when a peak magnitude of signal VIPC is equal to or smaller than 1/7 VBE, that occurs when the peak level of signal VIPC is equal to or smaller than 8/7 VBE, transistor Q2 becomes conductive and signal SYNCOUT is prevented from assuming the active, first logical state.

Output signal SYNCOUT of signal slicer 103 is coupled to a control circuit 104. Control circuit 104 generates a control signal 104a that is coupled to a vertical sawtooth signal generator 105 to control a vertical sawtooth signal that is used for vertical deflection purposes. When a user selects a television channel providing baseband video signal NTSC, output signal SYNCOUT of signal slicer 103 changes states in synchronism with the sync pulses of video signal NTSC. One type of such control circuit utilizes a vertical countdown technique. Control signal 104a is free-running at a nominal vertical rate such as 60 Hz when the user selects a television channel providing no video signal NTSC.

Had the first logical state occurred when no video signal NTSC is received, control circuit 104 could have generated control signal 104a at a rate that is, for example, substantially higher than the required, nominal rate of 60 Hz. To prevent such improper operation in control circuit 104, output signal SYNCOUT of signal slicer 104 is maintained continuously by the operation of transistor Q2 at the inactive, second logical state when no video NTSC signal is present, as explained before. Moreover, the second logical state is maintained continuously even in the presence of some level of noise when no video signal NTSC is present to provide noise immunity.

What is claimed is:

1. A sync separator of a video display apparatus, comprising:
    a source of an input video signal containing sync and picture information;
    a black level generator responsive to said video signal for generating a first signal with a predetermined black level containing sync pulses that correspond to said sync information of said input video signal;
    a peak detector responsive to said first signal for generating a peak level indicative signal that is indicative of a peak level of said sync pulses of said first signal;
    means responsive to said peak level indicative signal for generating a slice level indicative signal at a level that is indicative of a level intermediate said black level and said peak level of said sync pulses of said first signal;

means responsive to said first signal and, to said slice level indicative signal for generating, in accordance therewith, a pulse of an output signal having an active state, when a given pulse of said first signal occurs and an inactive state, when said pulses of said first signal do not occur; and switching means responsive to said peak level indicative signal and coupled to said output signal generating means for establishing said output signal at said inactive state, during the occurrence of said given pulse of said first signal, when a magnitude of said peak level is outside a predetermined normal operation range, such that when said peak level is within said normal operation range said switching means does not affect the state of said output signal.

2. An apparatus according to claim 1 wherein said peak detector comprises, a capacitor, an amplifier responsive to said first signal and to a feedback voltage that is developed in said capacitor for generating a switching control signal, a source of a first current that flows in said capacitor in a first direction, second switching means responsive to said switching control signal for generating, in accordance with said switching control signal, a pulse of a second current that flows in said capacitor when a predetermined difference between said first signal and said capacitor voltage occurs, said pulse of said second current being generated between a leading edge and a trailing edge of said pulse of said first signal.

3. An apparatus according to claim 2 wherein said output signal is coupled to a control circuit that generates a control signal at a nominal frequency related to a deflection frequency, provided that said active state of said output signal does not occur, and at a different frequency when said active state occurs.

4. An apparatus according to claim 1 wherein said output signal is coupled to a sawtooth generator of a vertical deflection circuit for synchronizing a vertical sawtooth signal.

5. An apparatus according to claim 1 wherein, when not disabled, said switching means clamps said slice level signal to a level that is determined in accordance with a reference level.

* * * * *